(12) United States Patent
Ishikawa et al.

(10) Patent No.: US 7,374,011 B2
(45) Date of Patent: May 20, 2008

(54) POWER STEERING APPARATUS

(75) Inventors: Shogo Ishikawa, Saitama (JP); Hideki Takahashi, Saitama (JP)

(73) Assignee: Hitachi, Ltd., Tokyo (JP)

(*) Notice: Subject to any disclaimer, the term of this patent is extended or adjusted under 35 U.S.C. 154(b) by 420 days.

(21) Appl. No.: 11/133,461

(22) Filed: May 20, 2005

(65) Prior Publication Data

US 2006/0011406 A1 Jan. 19, 2006

(30) Foreign Application Priority Data

May 21, 2004 (JP) .............................. 2004-152154

(51) Int. Cl.
*B62D 5/06* (2006.01)

(52) U.S. Cl. ...................... 180/417; 180/414; 180/428; 180/434; 180/439; 91/375 A; 91/378 R (58) Field of Classification Search ................ 180/417, 180/414, 428, 434, 439; 91/375 A, 378 R
See application file for complete search history.

(56) References Cited

U.S. PATENT DOCUMENTS

| | | | | |
|---|---|---|---|---|
| 5,086,687 A | * | 2/1992 | Elser et al. ............... | 91/375 A |
| 6,035,760 A | * | 3/2000 | Suzuki et al. ............. | 91/375 R |
| 6,050,171 A | * | 4/2000 | Sheppard .................... | 91/401 |
| 6,105,711 A | * | 8/2000 | Maruyama et al. ......... | 180/421 |
| 6,415,885 B2 | * | 7/2002 | Sonoda ....................... | 180/422 |
| 6,779,625 B2 | * | 8/2004 | Sonoda et al. ............. | 180/422 |
| 6,929,088 B2 | * | 8/2005 | Wienecke .................... | 180/441 |
| 2004/0055808 A1 | * | 3/2004 | Sonoda et al. ............. | 180/417 |

FOREIGN PATENT DOCUMENTS

| JP | 2001-055153 A | 2/2001 |
|---|---|---|
| JP | 2001-219858 A | 8/2001 |

* cited by examiner

*Primary Examiner*—Lesley D. Morris
*Assistant Examiner*—Marlon Arce-Diaz
(74) *Attorney, Agent, or Firm*—Foley & Lardner LLP

(57) ABSTRACT

A power steering apparatus includes an input shaft, an output shaft, a piston arranged to separate a first hydraulic chamber and a second hydraulic chamber, a ball screw mechanism, an output member, a control valve configured to supply hydraulic fluid selectively to the first hydraulic chamber through a first connecting passage and to the second hydraulic chamber through a second connecting passage, a first damper valve provided in the first connecting passage, a second damper valve provided in the second connecting passage, and a housing enclosing the piston. The housing is formed with a first valve receiving hole in which the first damper valve is disposed, and a second valve receiving hole in which the second damper valve is disposed.

12 Claims, 9 Drawing Sheets

POWER STEERING APPARATUS

BACKGROUND OF THE INVENTION

The present invention relates to power steering apparatus for producing a steering assist force by hydraulic pressure.

A patent document 1 (Japanese Patent Application Publication No. 2001-55153) shows power steering apparatus including a housing, a power cylinder enclosing a piston, a control valve, a sector gear. A patent document 2 (U.S. Pat. No. 6,415,885 corresponding to Japanese Patent Application Publication No. 2001-219858) shows power steering apparatus including a steering damper valve provided in a cylinder.

SUMMARY OF THE INVENTION

In the power steering apparatus of the document 1, when the kickback from the road is applied to a vehicle, the external force by the kickback is transmitted through the sector gear and the piston to hydraulic fluid in right and left chambers. Then, the hydraulic fluid flows reversely to the control valve, and adversely affects on driver's steering feeling.

In the apparatus of the document 1, the power cylinder is integrally formed with the housing. A connection part between the housing and the power cylinder is not located on an outer surface of the housing, and therefore the damper valve is not easily provided in the power steering apparatus.

It is an object of the present invention to provide power steering apparatus advantageous for size reduction and assembly operation.

According to one aspect of the present invention, a power steering apparatus comprises: an input shaft adapted to receive a driver's steering input; an output shaft connected with the input shaft by a torsion bar; a piston slidably mounted on the output shaft, and arranged to separate a first hydraulic chamber and a second hydraulic chamber; a ball screw mechanism disposed between the output shaft and the piston, and configured to covert a rotary motion of the output shaft into an axial motion of the piston; an output member to receive the axial motion of the piston and to deliver an output motion for steering; a control valve configured to supply hydraulic fluid selectively to the first hydraulic chamber through a first connecting passage and to the second hydraulic chamber through a second connecting passage, in accordance with an amount of torsion of the torsion bar caused by relative rotation between the input shaft and the output shaft; a first damper valve provided in the first connecting passage, and configured to open the first connecting passage in response to a hydraulic pressure from the control valve when the hydraulic pressure from the control valve exceeds a first valve opening pressure, and to open the first connecting passage in response to a hydraulic pressure from the first hydraulic chamber when the hydraulic pressure from the first hydraulic chamber exceeds a second valve opening pressure which is higher than the first valve opening pressure of the first damper valve; a second damper valve provided in the second connecting passage, and configured to open the second connecting passage in response to a hydraulic pressure from the control valve when the hydraulic pressure from the control valve exceeds a first valve opening pressure of the second damper valve, and to open the second connecting passage in response to a hydraulic pressure from the second hydraulic chamber when the hydraulic pressure from the second hydraulic chamber exceeds a second valve opening pressure of the second damper valve which is higher than the first valve opening pressure of the second damper valve; and a housing enclosing the piston, Sand being formed with a first valve receiving hole in which the first damper valve is disposed, and a second valve receiving hole in which the second damper valve is disposed.

According to another aspect of the invention, a power steering apparatus comprises: a shaft member extending axially from a first side to a second side of the power steering apparatus, and including an input shaft which is adapted to be rotated by receiving a driver's steering input and which is located on the first side, and an output shaft which is aligned with the input shaft and which is connected with the input shaft by a torsion bar; a piston slidably mounted on the output shaft, and arranged to define a hydraulic chamber; a mechanism configured to covert a rotary motion of the output shaft into an axial motion of the piston; an output member arranged to rotate by receiving the axial motion of the piston; a control valve configured to supply hydraulic fluid to the hydraulic chamber through a connecting passage in accordance with an amount of torsion of the torsion bar caused by relative rotation between the input shaft and the output shaft; a damper valve provided in the connecting passage, and configured to prevent kickback from being transmitted through the hydraulic fluid to the control valve; and a housing including a first end portion which is formed with a hole through which the input shaft extends into an inside cavity of the housing, and which is formed with a valve receiving hole extending axially and opening in an outside surface of the first end portion.

DETAILED DESCRIPTION OF THE INVENTION

Figure 1:
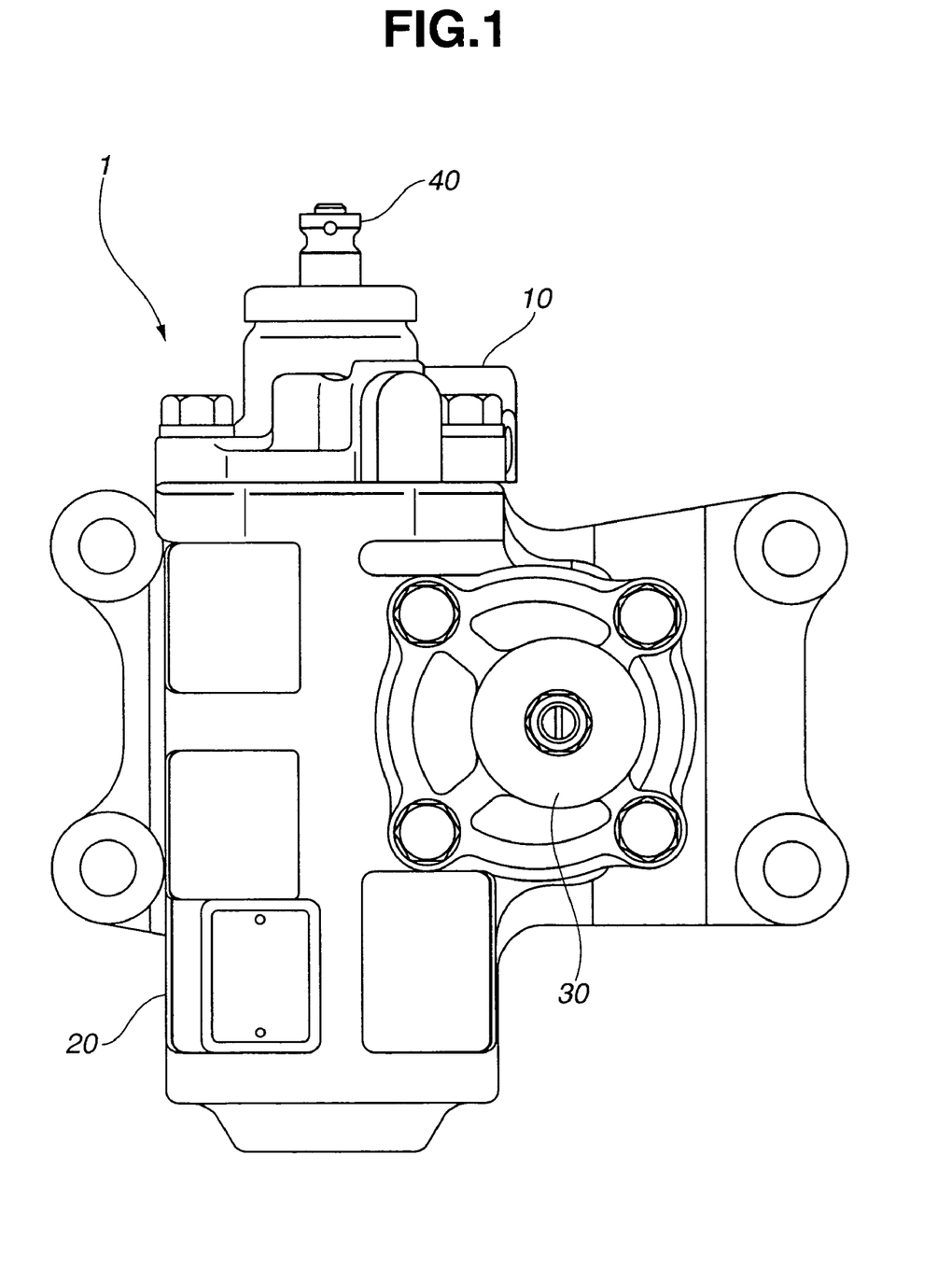
FIG. 1 is a side view showing a power steering apparatus according to one embodiment of the present invention.
Figure 2:
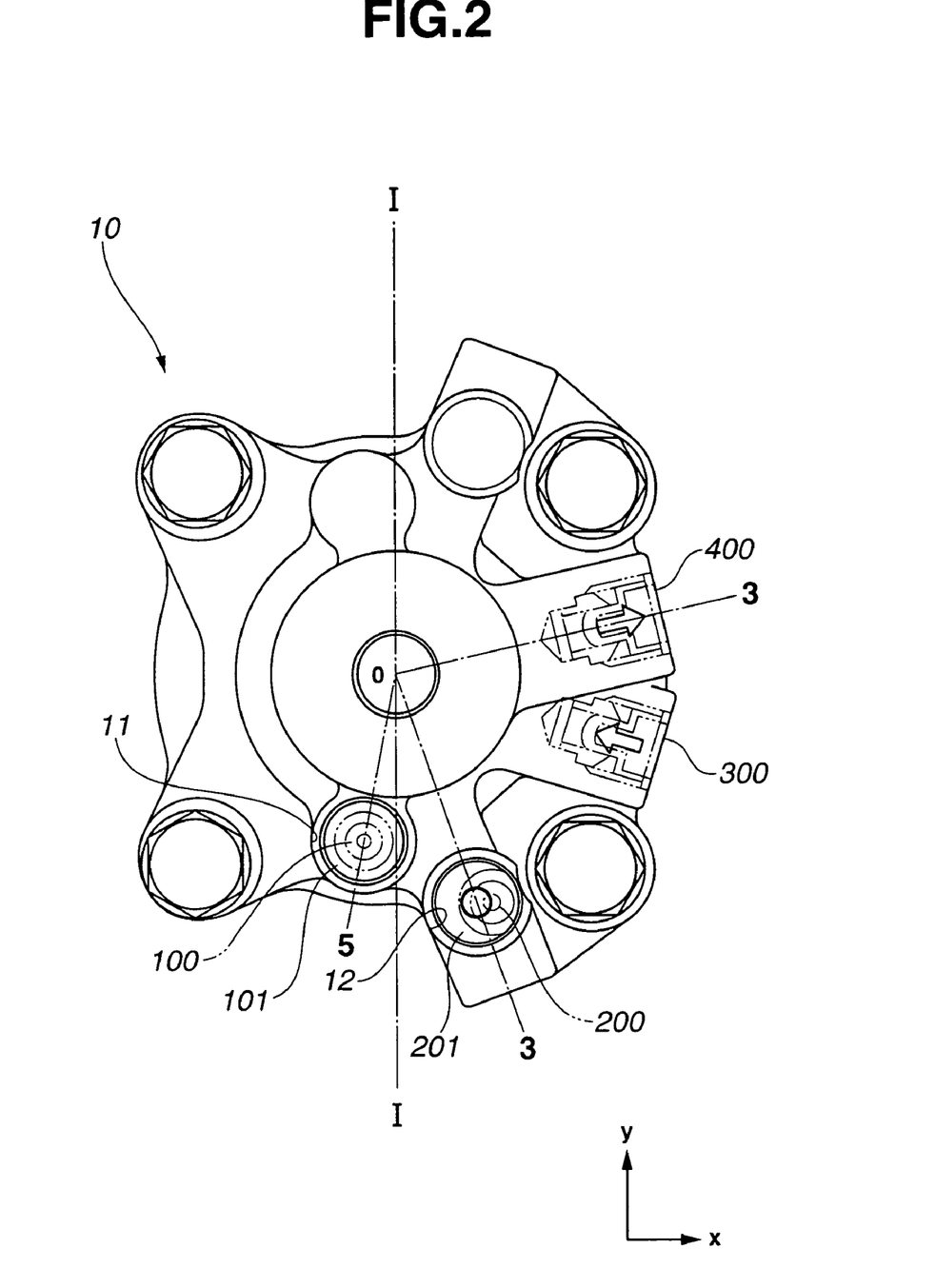
FIG. 2 is a plan view showing a valve housing of the power steering apparatus of FIG. 1.
Figure 3:
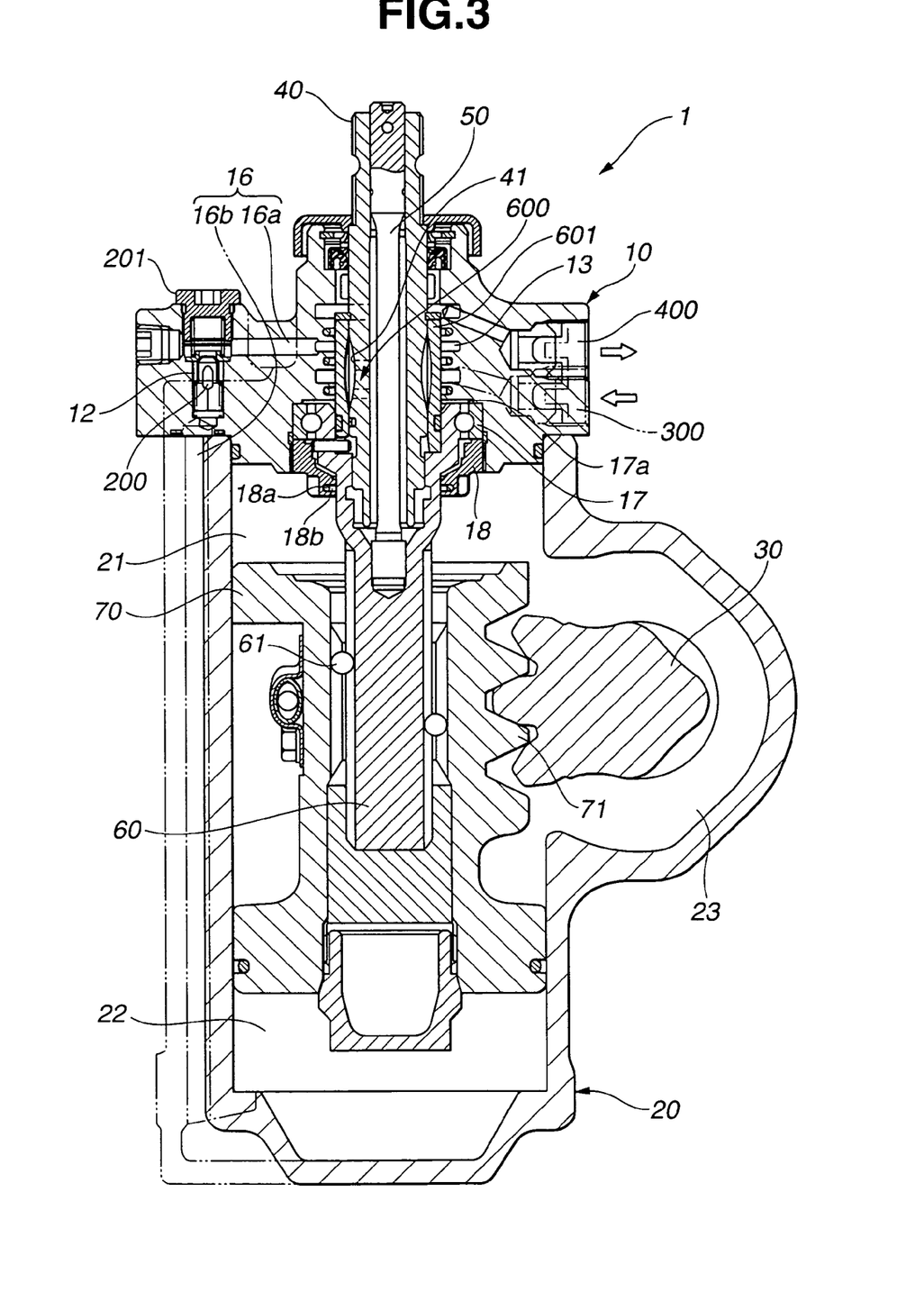
FIG. 3 is a sectional view taken along a section line 3-3 of FIG. 2.

FIGS. 1, 2 and 3 show power steering apparatus 1 according to one embodiment of the present invention. Power steering apparatus 1 shown in FIG. 1 includes a valve housing or first housing member 10 enclosing a control valve 600 for switching steering assist directions, a piston housing or second housing member 20 enclosing a piston 70 for producing steering assist force by hydraulic pressure, and a sector shaft 30 (serving as an output member) for steering steerable wheels of a vehicle by rotating in accordance with sliding motion of piston 70.

Each of valve housing 10 and piston housing 20 is a cup-shaped member having a bottom wall and a circumferential side wall. Valve housing 10 and piston housing 20 are joined together to form a single joined housing having an inside cavity bounded axially between the bottom walls of valve housing 10 and piston housing 20. An input shaft 40 extends axially from a first shaft end adapted to be connected with a steering wheel, to a second shaft end located within the inside cavity of the joined housing. Input shaft 40 is inserted axially through a center hole formed in the bottom wall of valve housing 10 (or the first end portion of the joined housing). Piston 70 is moved in an axial direction by hydraulic pressure generated in accordance with the rotation of input shaft 40. Piston 70 in piston housing 20 has teeth engaging with teeth formed on sector shaft 30, and thereby causes sector shaft 30 to rotate by the sliding motion of piston 70, and assists steering. Sector shaft 30 extends in a direction perpendicular to the axis of input shaft 40.

FIG. 2 shows valve housing 10 of the power steering apparatus of FIG. 1. Valve housing 10 includes a first damper valve 100, a second damper valve 200, an inlet port 300, and an outlet port 400. Inlet port 300 and outlet port 400 are formed in valve housing 10. Each of inlet port 300 and outlet port 400 is connected through control valve 600 with a first connecting passage 15 and a second connecting passage 16. First and second connecting passages 15 and 16 are connected with a first hydraulic chamber 21 and a second hydraulic chamber 22 in piston housing 20, respectively. A first damper valve receiving hole 11 and a second damper valve receiving hole 12 are formed, respectively, at intermediate points of first and second connecting passages 15 and 16, and arranged to receive first damper valve 100 and second damper valve 200, respectively. First and second valve receiving holes 11 and 12 are closed, respectively, by first and second plug members 101 and 201 so that first and second damper valves 100 and 200 are enclosed in the respective valve receiving holes 11 and 12.

Inlet port 300 and outlet port 400 extend radially in first and second radial directions which radiate from the axis of the center hole of valve housing 10 and which form a predetermined angle which is an acute angle in this example. Furthermore, inlet and outlet ports 300 and 400 are separated from each other by an axial distance in the axial direction. Moreover, first and second valve receiving holes 11 and 12 are separated from each other by a circumferential distance in the circumferential direction about the axis of the center hole of valve housing 10. In the example of FIG. 2, an angle formed between a radial direction extending from the axis of the center hole of valve housing 10 to the center position of first valve receiving hole 11 and a radial direction extending from the axis of the center hole of valve housing 10 to the center position of second valve receiving hole 12 is an acute angle as shown in FIG. 2.

Inlet and outlet ports 300 and 400 open radially outwards from valve housing 10. Second valve receiving hole 12, and inlet and outlet ports 300 and 400 are located on the right side of I-I line of FIG. 2 (or on the positive side along an x axis). First receiving hole 11 is located adjacent to second receiving hole 12, on the left side of second receiving hole 12 as viewed in FIG. 2 (on the negative side along the x axis).

FIG. 3 shows, in section, the power steering apparatus according to the embodiment of the present invention. Valve housing 10 includes inlet port 300, outlet port 400, and control valve 600. Piston housing 20 includes first hydraulic chamber 21, second hydraulic chamber 22, a sector shaft receiving portion 23, and piston 70.

Valve housing 10 is joined with piston housing 20 so that open end portions of valve housing 10 and piston housing 20 abut against each other. Input shaft 40 is inserted through valve housing 10 at the center of valve housing 10 in the axial direction. Input shaft 40 is connected with an output shaft 60 by a torsion bar 50. Output shaft 60 is inserted into piston 70 in the axial direction, and fit in piston 70 through a ball screw mechanism or ball recirculating mechanism 61. Piston 70 has an outer surface formed with a teeth portion or piston rack 71 in the circumferential direction, and engaging with sector shaft 30.

Piston 70 is disposed slidably in piston housing 20 in the axial direction. Piston 70 separates first hydraulic chamber 21 on input shaft's side of piston 70 (the upper side of piston 70 in FIG. 3) and second hydraulic chamber 22 on piston housing bottom's side of piston 70 (the lower side of piston 70 in FIG. 3), within piston housing 20. Piston housing 20 is arranged to be perpendicular to sector shaft 30. Piston housing 20 includes sector shaft receiving portion 23 formed in a radial outer portion of piston housing 20 (the right side of piston 70 as viewed in FIG. 3), and arranged to receive a part of sector shaft 30. Sector shaft receiving portion 23 is connected with first hydraulic chamber 21, and supplied with the hydraulic fluid to lubricate engaging parts between sector shaft 30 and teeth portion 71 of piston 70.

Inlet port 300 is a valve supplying the hydraulic fluid through control valve 600 into first and second hydraulic chambers 21 and 22 in piston housing 20, and connected with an oil pump (not shown). Outlet port 400 is a valve draining the hydraulic fluid through control valve 600 from first and second hydraulic chambers 21 and 22 in piston housing 20, and connected with a reservoir tank (not shown). First hydraulic chamber 21 in piston housing 20 is connected with control valve 600 through first connecting passage 15 formed in valve housing 10. Second hydraulic chamber 22 in piston housing 20 is connected with control valve 600 through second connecting passage 16 formed in both piston housing 20 and valve housing 10.

Control valve 600 is a rotary valve mechanism connected with inlet port 300 and outlet port 400. Control valve 600 connects or disconnects inlet port 300 and outlet port 400 with first connecting passage 15 or second connecting passage 16 so that control valve 600 supplies or drains the hydraulic fluid into or from first and second hydraulic chambers 21 and 22. Control valve 600 includes a cut portion 41 formed in the outer surface of input shaft 40, a valve groove 13 formed in the inner surface of valve housing 10, and a sleeve 601. Control valve 600 connects or disconnects inlet port 300 and outlet port 400 with first connecting passage 15 or second connecting passage 16 in accordance with the rotation of input shaft 40.

First and second connecting passages 15 and 16 in valve housing 10 are provided with first damper valve 100 and second damper valve 200, respectively. First connecting passage 15 includes a first control valve's side passage section (or radial passage section) 15a connecting first damper valve 100 and control valve 600, and a first hydraulic chamber's side passage section (or axial passage section) 15b connecting first damper valve 100 and first hydraulic chamber 21. Second connecting passage 16 includes a second control valve's side passage section (or radial passage section) 16a connecting second damper valve 200 and control valve 600, and a second hydraulic chamber's side passage section (or axial passage section) 16b connecting second damper valve 200 and second hydraulic chamber 22.

First damper valve 100 is so arranged that a second valve opening pressure allowing passage of the oil flowing from first hydraulic chamber 21 is higher than a first valve opening pressure allowing passage of the oil from control valve 600. Similarly, second damper valve 200 is so arranged that a second valve opening pressure allowing passage of the oil flowing from second hydraulic chamber 22 is higher than a first valve opening pressure allowing passage of the oil from control valve 600. Thereby, when piston 70 is moved by kickback from the road, first and second damper valves 100 and 200 restrict the hydraulic fluid in first hydraulic chamber 21 or second hydraulic chamber 22 from flowing in a reverse direction from first hydraulic chamber 21 or second hydraulic chamber 22 into control valve 600.

Output shaft 60 is supported rotatably in valve housing 10 by a bearing 17. In the assembly operation, bearing 17 and output shaft 60 are fit in valve housing 10, and then an adjusting plug 18 is fit in valve housing 10 to limit axial movement of output shaft 60.

Adjusting plug 18 is provided with an O-ring 18a and a seal ring 18b on the inner circumference of adjusting plug member 18. Bearing 17 is supplied with the hydraulic fluid through a bearing hydraulic chamber (or passage) 17a connected with control valve 600 for lubrication. Seal ring 18b is forced against the outer surface of output shaft 60 by resilient force of O-ring 18a so as to form a contact in surface between seal ring 18b and output shaft 60, and thereby ensures sealing of the oil between bearing hydraulic chamber 17a and first hydraulic chamber 21.

Figure 4:
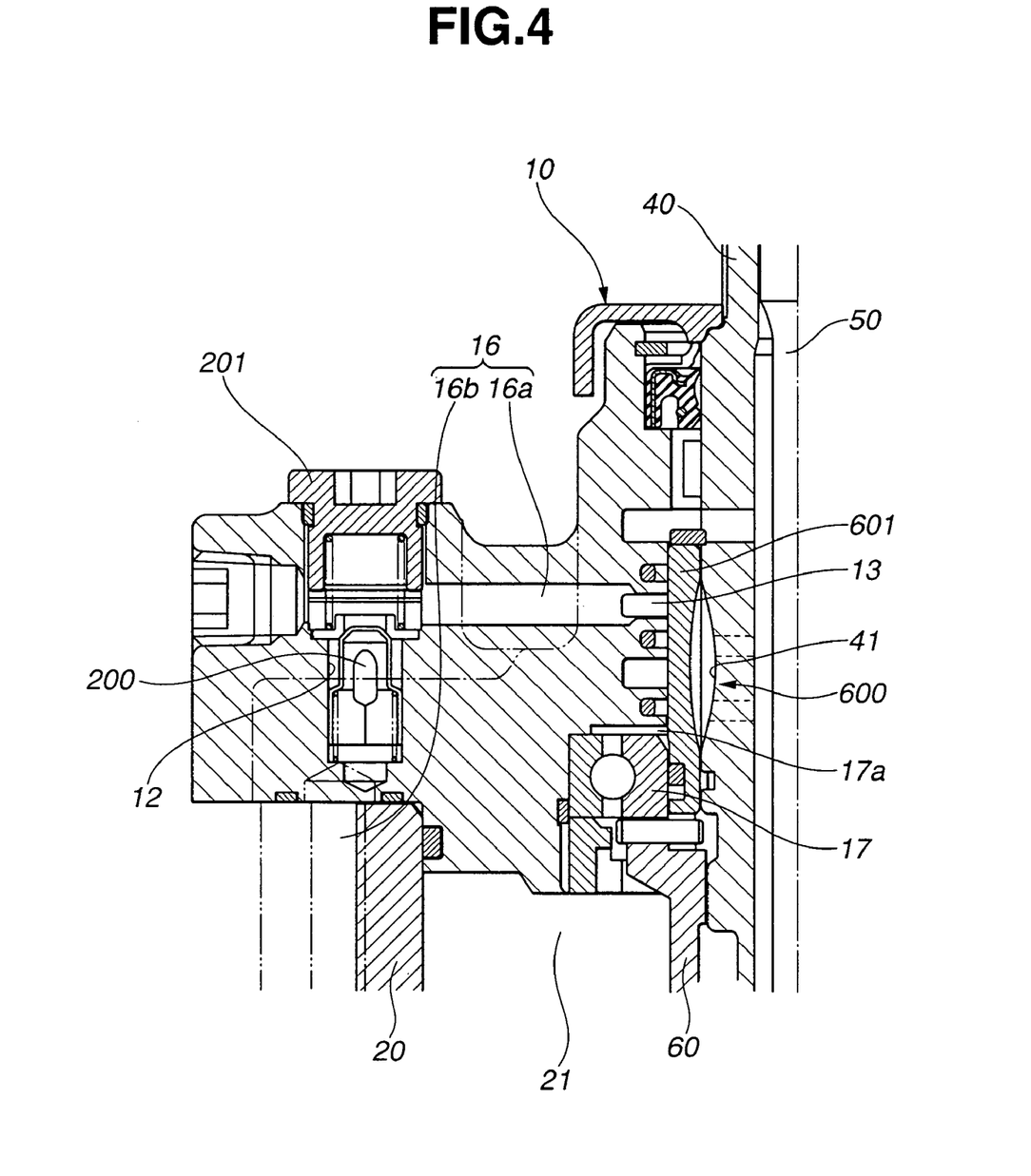
FIG. 4 is a sectional view taken along a section line 0-3 of FIG. 2.

FIG. 4 is a view showing second connecting passage 16 including second control valve's side passage 16a and second hydraulic chamber's side passage 16b.

As mentioned above, second connecting passage 16 in valve housing 10 is provided with second damper valve 200. Second damper valve 200 is so arranged that a second valve opening pressure allowing passage of the oil flowing from second hydraulic chamber 22 is higher than a first valve opening pressure allowing passage of the oil from control valve 600. Thereby, when piston 70 is moved by the kickback from the road, second damper valve 200 restricts the hydraulic fluid in second hydraulic chamber 22 from flowing in the reverse direction from second hydraulic chamber 22 into control valve 600, and hence restricts the external force from the road from transmitting through input shaft 40 to the steering wheel.

Second connecting passage 16 is composed of second control valve's side passage section 16a connecting second damper valve 200 and control valve 600, and second hydraulic chamber's side passage section 16b connecting second damper valve 200 and second hydraulic chamber 22. Second control valve's side passage section 16a extends from control valve 600, to an open end opened in a circumferential side wall surface of second damper valve receiving hole 12. Second hydraulic chamber's side passage section 16b extends from second hydraulic chamber 22, to an open end opened in a bottom of second damper valve receiving hole 12. Second hydraulic chamber's side passage section 16b is formed in both valve housing 10 and piston housing 20 by drilling from second damper valve receiving hole 12.

Second valve receiving hole 12 is formed radially outside control valve 600 in valve housing 10 so as to be opened axially outwards, and extends straight in the axial direction. Second valve receiving hole 12 and second hydraulic chamber's side passage section 16b are straight and aligned in a line so as to form second hydraulic chamber's side passage section 16b by drilling from second valve receiving hole 12. Alternatively, second valve receiving hole 12 and second hydraulic chamber's side passage section 16b may be offset slightly and parallel to each other. Second control valve's side passage section 16a extends straight and radially inwards from second valve receiving hole 12 in valve housing 10, and thereby reduces the lengths of second valve receiving hole 12 and valve housing 10 in the axial direction.

Figure 5:
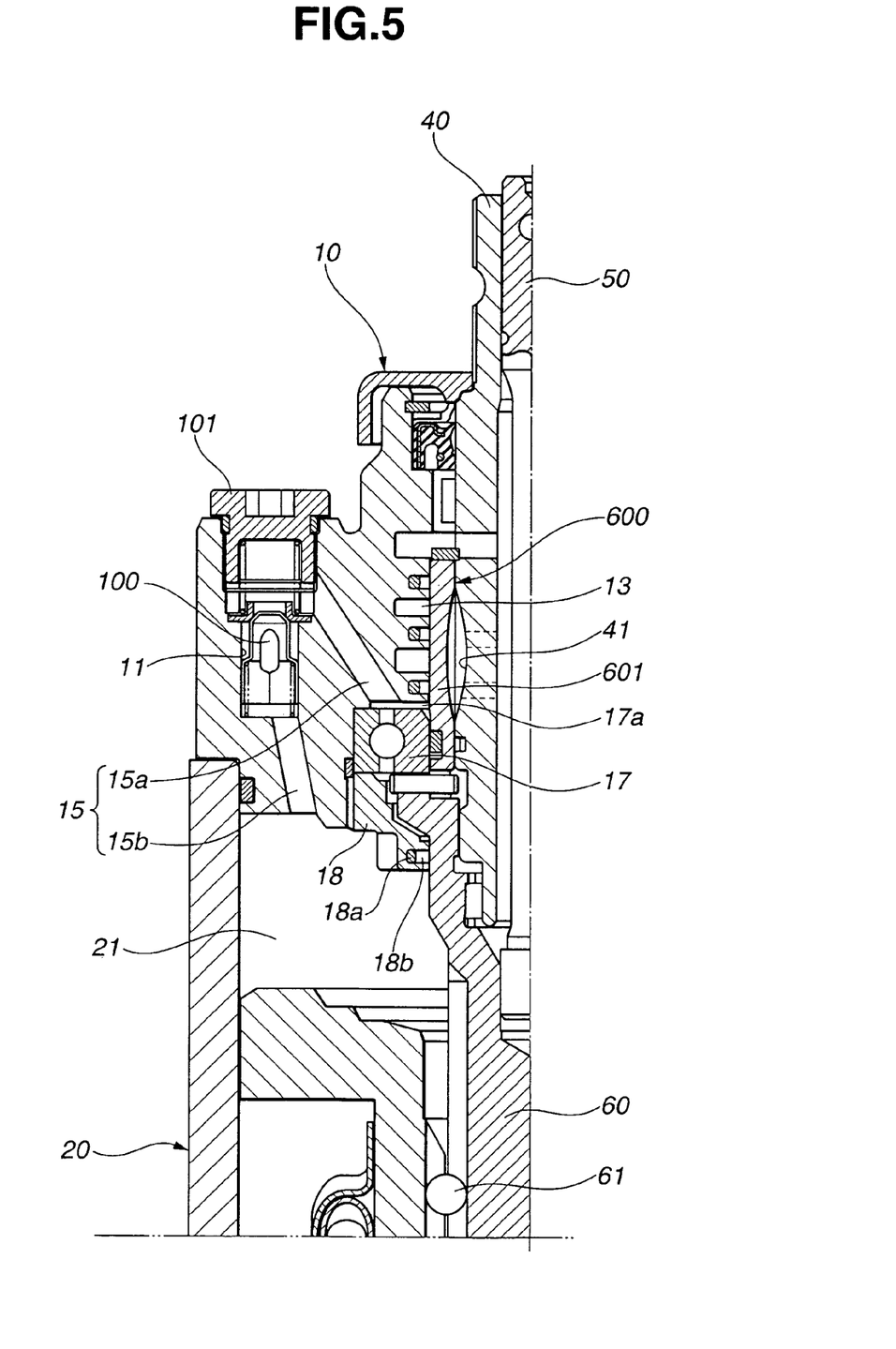
FIG. 5 is a sectional view taken along a section line 0-5 of FIG. 2.

FIG. 5 is a view showing first connecting passage 15 including first control valve's side passage section 15a and first hydraulic chamber's side passage section 15b.

First damper valve 100 is so arranged that a second valve opening pressure allowing passage of the oil flowing from first hydraulic chamber 21 is higher than a first valve opening pressure allowing passage of the oil from control valve 600. Thereby, when piston 70 is moved by the kickback from the road, first damper valve 100 restricts the hydraulic fluid in first hydraulic chamber 22 from flowing in the reverse direction from first hydraulic chamber 21 into control valve 600, and hence restricts the external force from the road from transmitting through input shaft 40 to the steering wheel.

For the sealing between first hydraulic chamber 21 and bearing hydraulic chamber 17a with O-ring 18a and seal ring 18b, when a pressure difference between first hydraulic chamber 21 and bearing hydraulic chamber 17a is generated, the hydraulic fluid flows through first damper valve 100 between first hydraulic chamber 21 and bearing hydraulic chamber 17a. Thereby, the power steering apparatus restricts the external force by the kickback from transmitting to control valve 600.

First valve receiving hole 11 is formed radially outside control valve 600 in valve housing 10 so as to be opened axially outwards, and extends straight in the axial direction, like second valve receiving hole 12. First connecting passage 15 is composed of first control valve's side passage section 15a connecting first damper valve receiving hole 11 and bearing hydraulic chamber 17a, and first hydraulic chamber's side passage section 15b connecting first damper valve receiving hole 11 and first hydraulic chamber 21. First control valve's side passage section 15a extends from control valve 600, to an open end opened in a circumferential side wall surface of first damper valve receiving hole 11. First hydraulic chamber's side passage section 15b extends from first hydraulic chamber 21, to an open end opened in a bottom of first damper valve receiving hole 11. First control valve's side passage section 15a and first hydraulic chamber's side passage section 15b both extend straight from first valve receiving hole 11, so that both passage sections can be formed by drilling from first valve receiving hole 11. First control valve's side passage section 15a extends radially inwards from first valve receiving hole 11, and thereby reduces the lengths of first valve receiving hole 11 and valve housing 10 in the axial direction.

Figure 6A:
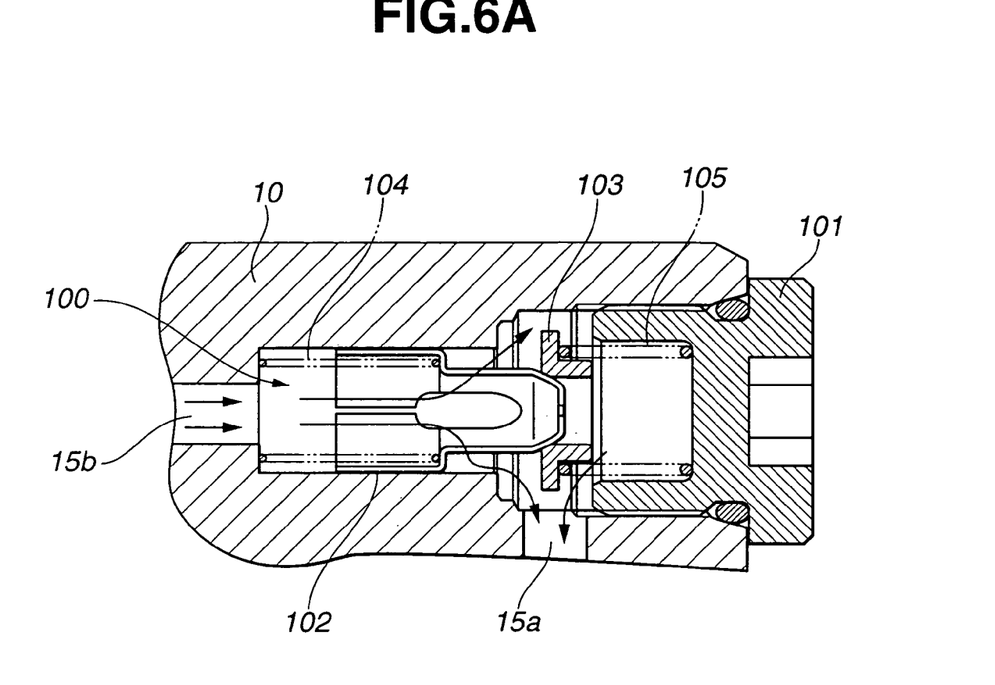
FIGS. 6A and 6B are sectional view and circuit diagram showing a kickback dampening operation of a damper valve used in the power steering apparatus of FIG. 3 in a reverse flow state.
Figure 6B:
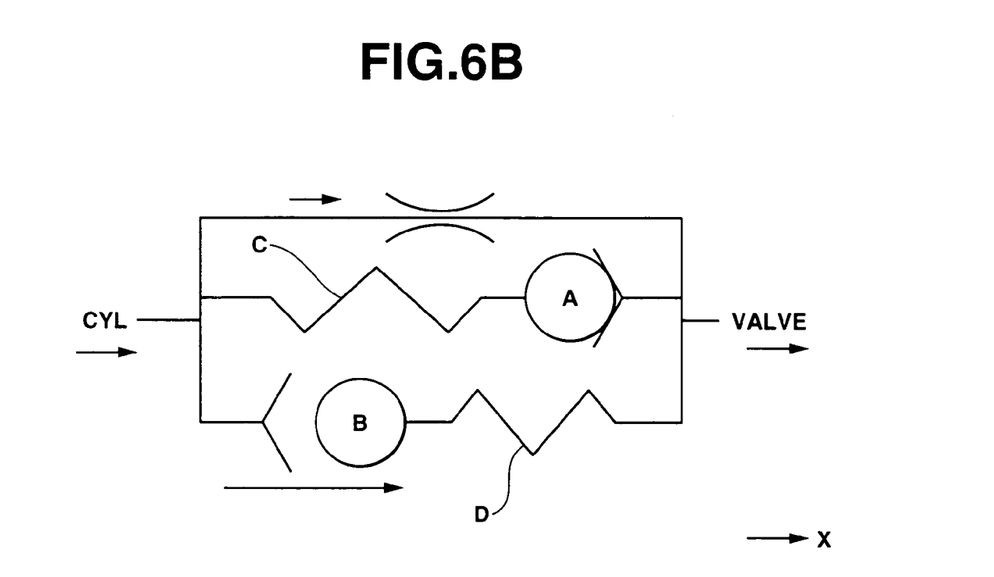

FIG. 6A shows operation of first damper valve 100 for dampening the kickback in a reverse flow state in which the hydraulic fluid is discharged from first hydraulic chamber 21 through first damper valve 100 to control valve 600. FIG. 6B shows a circuit diagram of FIG. 6A. First and second damper valves 100 and 200 are substantially identical in structure and operation, and the following description is directed only to first damper valve 100.

First damper valve 100 includes a poppet valve 102 (corresponding to A shown in FIG. 6B), a seat valve 103 (corresponding to B shown in FIG. 6B), a poppet valve spring 104 (corresponding to C shown in FIG. 6B), and a seat valve spring 105 (corresponding to D shown in FIG. 6B). In the reverse flow state, by the kickback from the road, piston 70 is moved in a direction to contract first hydraulic chamber 21, and thereby positive pressure from first hydraulic chamber 21 is applied to first damper valve 100 in accordance with a decrease in the volume of first hydraulic chamber 21. Accordingly, the hydraulic fluid in first hydraulic chamber 21 tries to flow through first damper valve 100 toward control valve 600.

In this reverse flow state, the positive pressure from first hydraulic chamber 21 is applied to poppet valve 102, poppet valve 102 (A) is urged in a positive direction of x-axis of FIG. 6B, and abuts on seat valve 103. Seat valve 103 (B) is urged by seat valve spring 105 (D) in a negative direction of x-axis of FIG. 6B, and thereby an opening of seat valve 103 is closed by a forward end portion of poppet valve 102. Therefore, the hydraulic fluid flow between first hydraulic chamber's side passage section 15b and first control valve's side passage section 15a is restricted.

Accordingly, when piston 70 is moved by the kickback from the road, the positive pressure from first hydraulic chamber 21 is applied to damper valve 100, and this apparatus restricts the hydraulic fluid from flowing abruptly from first hydraulic chamber 21 to control valve 600, and thereby prevents the external force by the kickback from transmitting through input shaft 40 to the steering wheel.

Figure 7A:
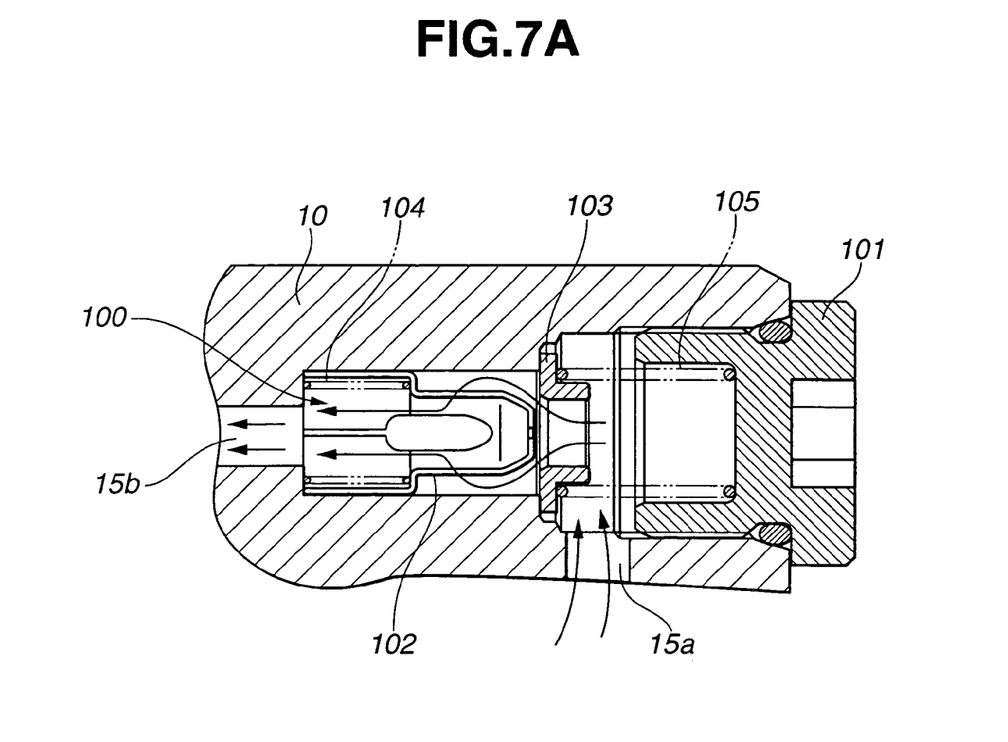
FIGS. 7A and 7B are sectional view and circuit diagram showing a kickback dampening operation of the damper valve used in the power steering apparatus of FIG. 3 in a forward flow state.
Figure 7B:
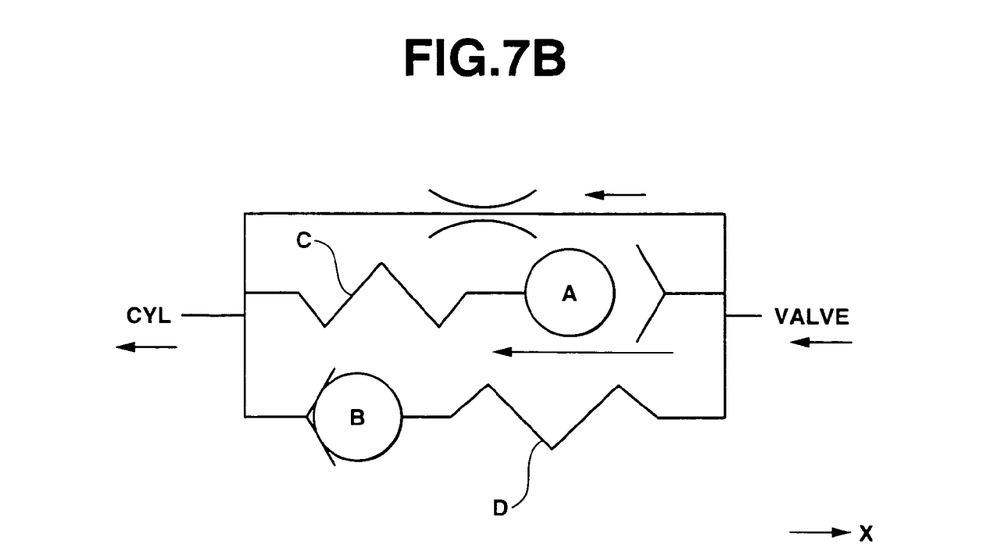

FIG. 7A shows operation of first damper valve 100 for dampening the kickback in a forward flow state in which the hydraulic fluid is supplied from control valve 600 through first damper valve 100 to first hydraulic chamber 21. FIG. 7B shows a circuit diagram of FIG. 7A. First and second damper valves 100 and 200 are substantially identical in structure and operation, and the following description is directed only to first damper valve 100.

In the forward flow state, by the kickback from the road, piston 70 is moved in a direction in which first hydraulic chamber 21 is expanded, and thereby negative pressure from first hydraulic chamber 21 is applied to first damper valve 100 in accordance with an increase in the volume of first hydraulic chamber 21. Accordingly, the hydraulic fluid in control valve 600 tries to flow through first damper valve 100 toward first hydraulic chamber 21.

In this forward flow state, the negative pressure from first hydraulic chamber 21 is applied to poppet valve 102, and poppet valve 102 (A) is urged against the resilient force of poppet valve spring 104 (C), in the negative direction of x-axis of FIG. 7B. Seat valve 103 is urged by seat valve spring 105 (D) in the negative direction of x-axis of FIG. 7B, and thereby seat valve 103 abuts on a cylindrical seat portion in valve housing 10. Therefore, the hydraulic fluid flow between first hydraulic chamber's side passage section 15b and first control valve's side passage section 15a is restricted.

Accordingly, when piston 70 is moved by the kickback from the road, the negative pressure from the first hydraulic chamber 21 is applied to damper valve 100, this apparatus restricts the hydraulic fluid from flowing instantaneously from control valve 600 to first hydraulic chamber 21, and thereby prevents the external force by the kickback from transmitting through input shaft 40 to the steering wheel.

Figure 8A:
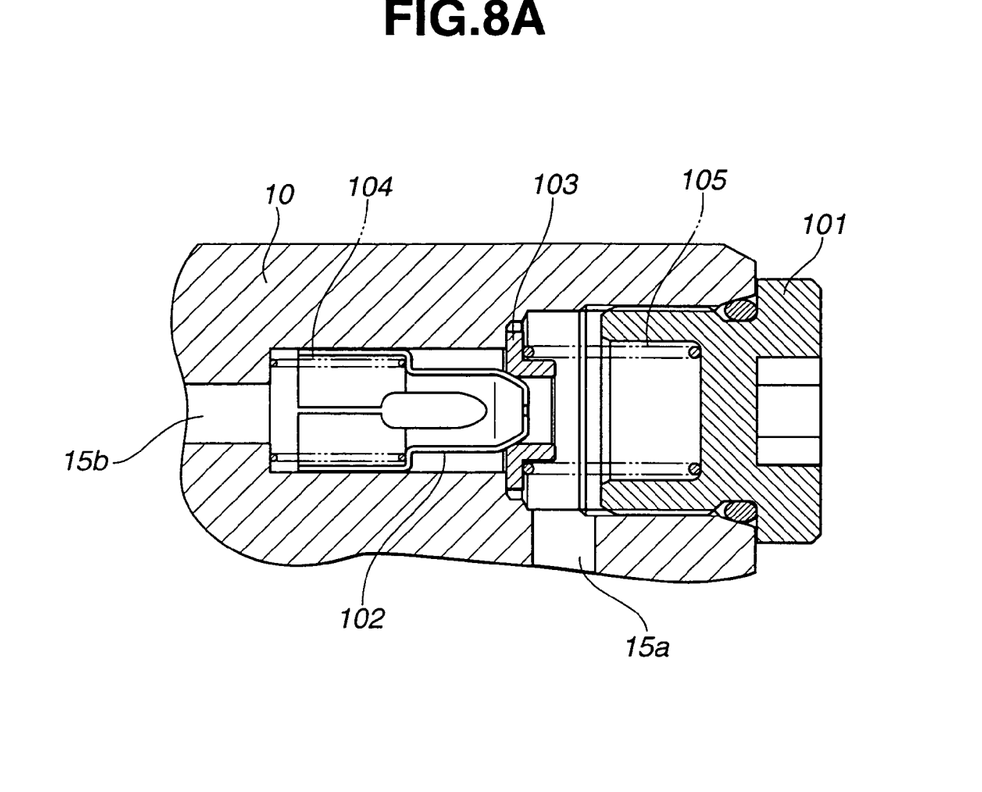
FIGS. 8A and 8B are sectional view and circuit diagram showing a kickback dampening operation of the damper valve used in the power steering apparatus of FIG. 3 in a neutral state.
Figure 8B:
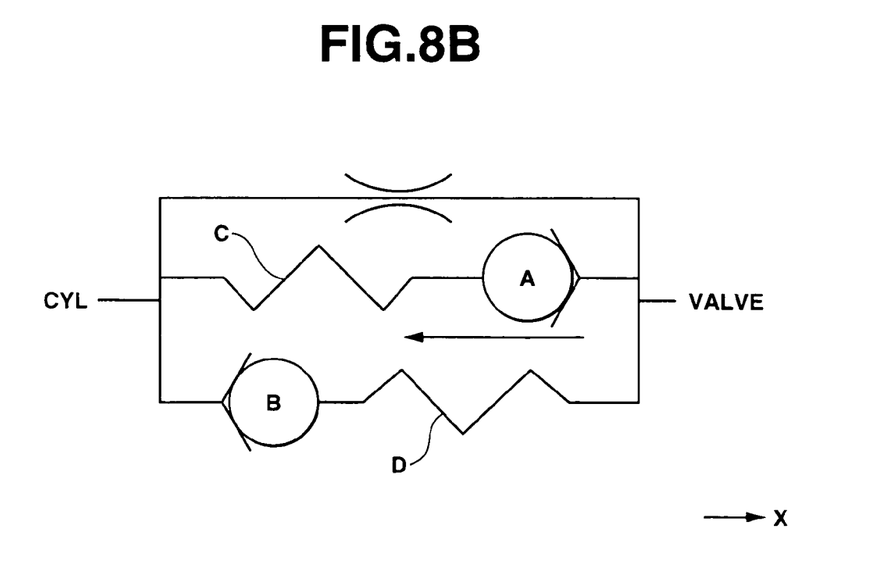

FIG. 8A shows operation of first damper valve 100 for dampening the kickback in a neutral state in which no effort is applied to the steering wheel, and no fluid flow is acting in first damper valve. FIG. 8B shows a circuit diagram of the arrangement of FIG. 8A. First and second damper valves 100 and 200 are substantially identical in structure and operation, and the following description is directed only to first damper valve 100.

In the neutral state in which the hydraulic fluid does not flow in damper valve 100, poppet valve 102 is urged by poppet valve spring 104 in the positive direction of x-axis of FIG. 8B. Seat valve 103 is urged by seat valve spring 105 in the negative direction of x-axis of FIG. 8B. Therefore, the opening of seat valve 103 is closed by the forward end portion of poppet valve 102, and seat valve 103 abuts on the cylindrical seat portion in valve housing 10. The hydraulic fluid flow between first hydraulic chamber's side passage section 15b and first control valve's side passage section 15a is restricted.

Accordingly, when piston 70 is moved by the kickback from the road in the neutral state, this apparatus restricts the hydraulic fluid from flowing instantaneously between control valve 600 and first hydraulic chamber 21, and thereby prevents the external force by the kickback from transmitting through input shaft 40 to the driver.

Figure 9:
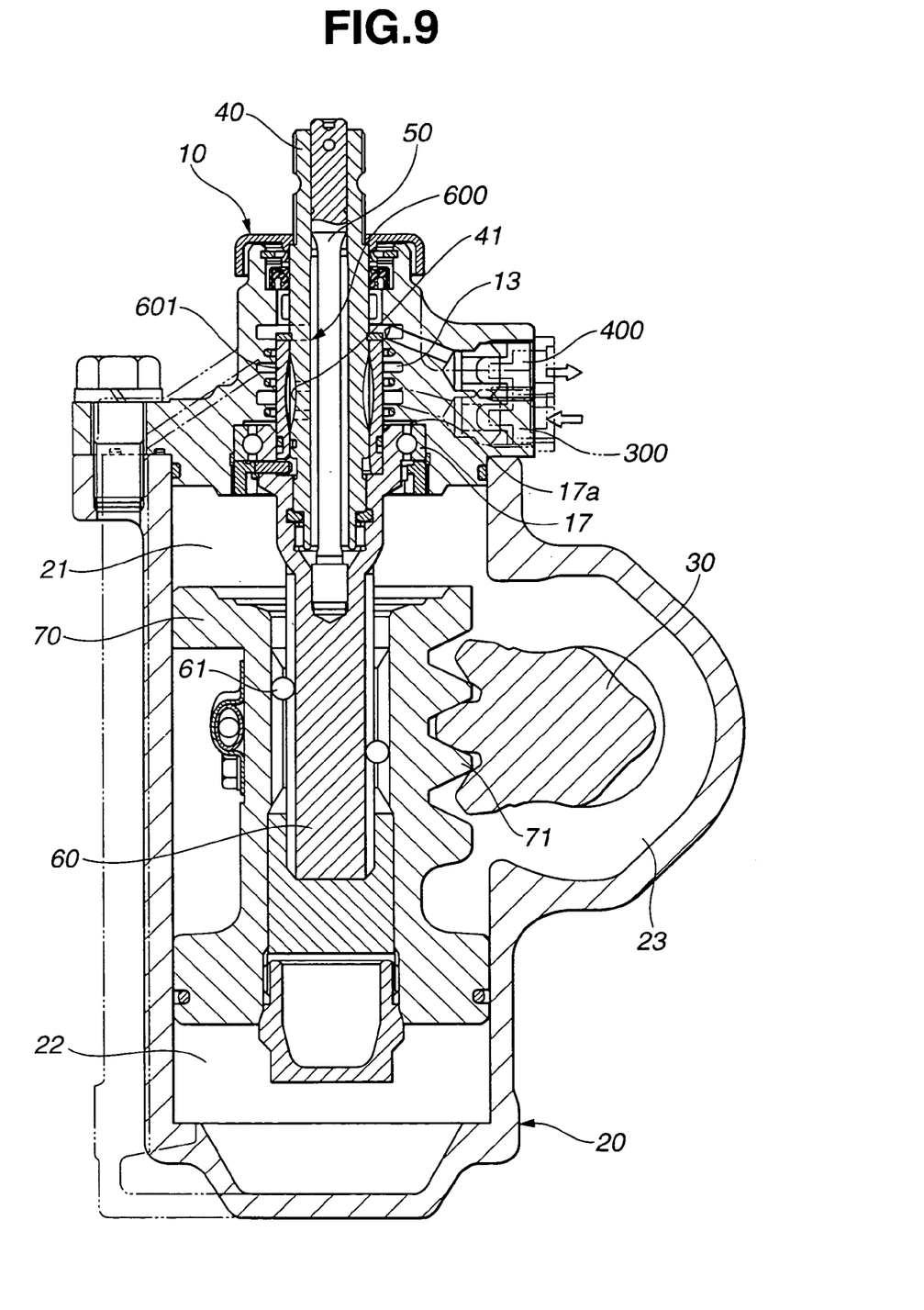
FIG. 9 is a sectional view showing a power steering apparatus of earlier technology.

In a comparative example of a power steering apparatus of earlier technology as shown in FIG. 9, when the kickback from the road is applied to a vehicle, the external force by the kickback is transmitted through a sector shaft 30 and a piston 70 to the hydraulic fluid in first and second hydraulic chambers 21 and 22. Then, the hydraulic fluid flows reversely to a control valve 600, and thereby adversely affects on the driver's steering feeling. In this power steering apparatus, a power cylinder is integrally formed with the housing, and a connection part between a housing and the power cylinder is not located on an outer surface of the housing. Therefore damper valves can not be readily installed in the power steering apparatus. Moreover, in this apparatus, the hydraulic fluid is supplied to first hydraulic chamber 21 through a bearing 17 disposed between an input shaft 40 and a valve housing 10. Therefore, it is very difficult to provide a damper valve in a connection passage to the hydraulic chamber 21.

In the illustrated embodiment, the damper valve receiving holes are both opened in an outside end face of a first end portion (or end wall) of the joined housing (10, 20) on the input shaft's side, and closed, respectively, with the plug members. As viewed in FIG. 3, the first end portion is an upper end portion formed with a center hole through which input shaft 40 extends into the inside cavity of the joined housing (10, 20). In FIG. 3, the outside end face faces upwards in the axial direction of input shaft 40. In the assembly operation, the damper valves are inserted, respectively, into the respective valve receiving holes from the open ends formed in the same upwardly facing end face of the housing. This arrangement is advantageous for the assembly operation.

The inlet port (or connection portion) to be connected with the oil pump to receive the supply of hydraulic fluid opens radially outwards. The first and second valve receiving holes are located adjacent to each other between the inlet port and a side face diametrically opposite to the inlet port. In the assembly operation of the damper valves, the housing is fixed to a jig so that the connection part between the housing and the oil pump is directed upwards. The jig includes a floor and a side wall to fix the housing firmly. The first and second receiving holes are located in a position opposite to the side surface, and thereby the assembly operation is not obstructed by the floor and side faces, and hence this arrangement is advantageous for the assembly operation.

The valve receiving holes are formed radially outside the control valve, and thereby reduces the length of the housing in the axial direction. The first control valve's side passage section extends from the control valve, to the open end opened in the circumferential side wall surface of the first damper valve receiving hole. The first hydraulic chamber's side passage section extends from the first hydraulic chamber, to the open end opened in the bottom of the first valve receiving hole. The second control valve's side passage section extends from the control valve, to the open end opened in the circumferential side wall surface of the second damper valve receiving hole. The second hydraulic chamber's side passage section extends from the second hydraulic chamber, to the open end opened in the bottom of the second valve receiving hole. Therefore, it is possible to decrease the axial lengths of the damper valve receiving holes.

The passage sections of the first connecting passage both extend straight from the first valve receiving hole. The passage sections of the second connecting passage both extend straight from the second valve receiving hole. Therefore, the hydraulic fluid can flow smoothly through these passages.

The first radial passage section of the first connecting passage is formed by drilling from the open end of the first valve receiving hole which is opened in the outside end face of the first end portion of the joined housing. Therefore, there is no need for additional plug member.

The input shaft is supported in the housing by the bearing held by the adjusting plug member. The adjusting plug member is provided with the O-ring and the seal ring on the sliding portion between the adjusting plug member and the output shaft, and thereby ensures the sealing between the first hydraulic chamber and the control valve. When the pressure differential is generated between the first hydraulic chamber and the control valve, the hydraulic fluid flows through the first damper valve, and hence this apparatus restricts the kickback reliably.

This application is based on a prior Japanese Patent Application No. 2004-152154. The entire contents of the Japanese Patent Application No. 2004-152154 with a filing date of May 21, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
    a housing having a hydraulic chamber;
    an input shaft adapted to receive a driver's steering input;
    an output shaft connected with the input shaft by a torsion bar;
    a piston slidably mounted on the output shaft, and arranged to partition the hydraulic chamber into a first hydraulic chamber and a second hydraulic chamber;
    a ball screw mechanism disposed between the output shaft and the piston, and configured to convert a rotary motion of the output shaft into an axial motion of the piston;
    an output member to receive the axial motion of the piston and to deliver an output motion for steering;
    a control valve configured to supply hydraulic fluid selectively to the first hydraulic chamber and to the second hydraulic chamber, in accordance with an amount of torsion of the torsion bar caused by relative rotation between the input shaft and the output shaft;
    a first connecting passage connecting the control valve and the first hydraulic chamber;
    a second connecting passage connecting the control valve and the second hydraulic chamber;
    a portion defining a first valve receiving hole and provided in the first connecting passage;
    a portion defining a second valve receiving hole and provided in the second connecting passage;
    a first damper valve provided in the first valve receiving hole, and configured to open the first connecting passage in response to a hydraulic pressure from the control valve when the hydraulic pressure from the control valve exceeds a first valve opening pressure of the first damper valve, and to open the first connecting passage in response to a hydraulic pressure from the first hydraulic chamber when the hydraulic pressure from the first hydraulic chamber exceeds a second valve opening pressure of the first damper valve which is higher than the first valve opening pressure of the first damper valve; and
    a second damper valve provided in the second valve receiving hole, and configured to open the second connecting passage in response to a hydraulic pressure from the control valve when the hydraulic pressure from the control valve exceeds a first valve opening pressure of the second damper valve, and to open the second connecting passage in response to a hydraulic pressure from the second hydraulic chamber when the hydraulic pressure from the second hydraulic chamber exceeds a second valve opening pressure of the second damper valve which is higher than the first valve opening pressure of the second damper valve.

2. The power steering apparatus as claimed in claim 1, wherein the housing is formed with the first connecting passage and the second connecting passage.

3. The power steering apparatus as claimed in claim 1, wherein the first and second valve receiving holes of the housing extend in an axial direction of the input shaft and open in an end face of the housing, and each of the first and second receiving holes of the housing is closed with a plug member.

4. The power steering apparatus as claimed in claim 1, wherein the housing includes an inlet port opening radially outwards; and the first and second valve receiving holes of the housing are located between the inlet port and a side face diametrically opposite to the inlet port, and arranged circumferentially at an acute angle.

5. The power steering apparatus as claimed in claim 1, wherein the first and second receiving holes of the housing are located radially outside the control valve; the first connecting passage includes a first radial passage section connecting the control valve and a side surface of the first valve receiving hole, and a first axial passage section connecting the first hydraulic chamber and a bottom of the first valve receiving hole; and the second connecting passage includes a second radial passage section connecting the control valve and a side surface of the second valve receiving hole, and a second axial passage section connecting the second hydraulic chamber and a bottom of the second valve receiving hole.

6. The power steering apparatus as claimed in claim 5, wherein the first radial passage section and the first axial passage section of the first connecting passage both extend straight from the first valve receiving hole; and the second radial passage section and the second axial passage section of the second connecting passage both extend straight from the second valve receiving hole.

7. The power steering apparatus as claimed in claim 5, wherein at least one of the first and second radial passage sections is formed by drilling from an open end of a respective one of the first and second valve receiving holes which is open in an end surface of the housing.

8. The power steering apparatus as claimed in claim 5, wherein the housing includes an inside cavity which is divided by the piston into the first hydraulic chamber on one side of the piston closer to the input shaft than the second hydraulic chamber, and the second hydraulic chamber on the other side of the piston; and the first radial passage section is formed by drilling from an open end of the first valve receiving hole which is open in an end surface of the housing.

9. The power steering apparatus as claimed in claim 8, wherein the housing is formed with the bearing hydraulic passage; and the first radial passage section is connected through the bearing hydraulic passage to the control valve.

10. The power steering apparatus as claimed in claim 8, wherein the input shaft is supported in the housing by a bearing held by an adjusting plug member; and the power steering apparatus further includes an O-ring and a seal ring which are disposed in a sliding portion between the adjusting plug member and the output shaft.

11. The power steering apparatus as claimed in claim 10, wherein the housing includes a first housing member supporting the input shaft rotatably, and a second housing member joined with the first housing member; and the second housing member includes an inside cavity which is divided by the piston into the first hydraulic chamber between the first housing member and the piston, and the second hydraulic chamber.

12. The power steering apparatus as claimed in claim 11, wherein the first housing member is formed with the first and second valve receiving holes extending axially, and opening in an outside surface of the first housing member.

* * * * *